Oct. 27, 1931.   J. KAUTZKY, JR   1,829,006
FREE SPOOL FISHING REEL
Filed Aug. 4, 1930

Witness
Ralph Collins

Inventor
Joe Kautzky Jr.
by Bair, Freeman & Sinclair
Attorneys

Patented Oct. 27, 1931

1,829,006

UNITED STATES PATENT OFFICE

JOE KAUTZKY, JR., OF FORT DODGE, IOWA

FREE-SPOOL FISHING REEL

Application filed August 4, 1930. Serial No. 472,811.

The object of this invention is to provide an improvement in free-spool fishing reels whereby the spool is automatically and positively released from the winding gear and immediately upon release of the crank by the operator, as for making a cast.

A further object of the invention is to provide an improved construction for a free-spool fishing reel including means for accomplishing a forced disengagement of the gears through a clutch mechanism, such disengagement being accomplished by an automatic backward snap action of the crank through the instrumentality of a retractile spring.

Another object of the invention is to provide improved means for connecting one end of the retractile spring yieldingly to the winding mechanism, for limited movement, in such manner as to insure that uniform tension will be applied to said spring.

Still another object of the invention is to provide an improved free-spool fishing reel involving positive and certain means for engaging and disengaging the clutch connections between the crank and the spool.

A further object of the invention is to provide an improvement in free-spool fishing reels in which provision is made for insuring that the free-spool clutch will not be released when a sudden outward tug on the line occurs through the strike of a heavy fish which would tend to force the crank from the operator's fingers; thereby preventing the spooling off of a quantity of uncontrolled line.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1:
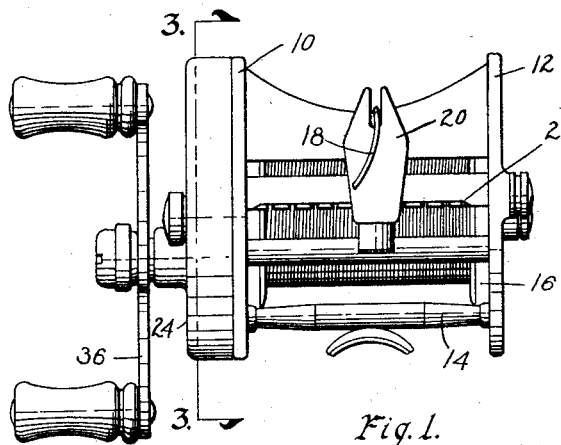
Figure 1 is a front elevation illustrating my improved free-spool fishing reel.
Figure 2:
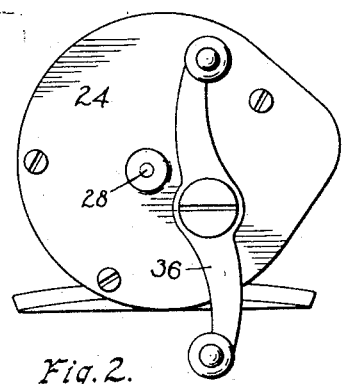
Figure 2 is a side elevation of the same.

The fishing reel includes a skeleton cylindrical frame consisting primarily of spaced discs or head plates 10 and 12, connected by a plurality of spaced cross bars 14, other parts being employed which are not concerned with my present invention and which are shown more or less conventionally.

A spool 16 is suitably journaled for rotation within the skeleton frame and is adapted to receive a fishing line 18 to be wound thereon. The spool 16 may be provided with a cork or other suitable facing 17. The winding of the line 18 on the spool may be controlled by a traversing carriage such as 20 arranged for travel at the front of the frame and controlled by a line carriage shaft 22.

Mounted on the outer face of the disc or head plate 10 is a housing 24 of cylindrical shape and a spindle 26 is mounted transversely of said housing and projects therefrom in a position forwardly of the axis of the spool 16.

Figure 4:
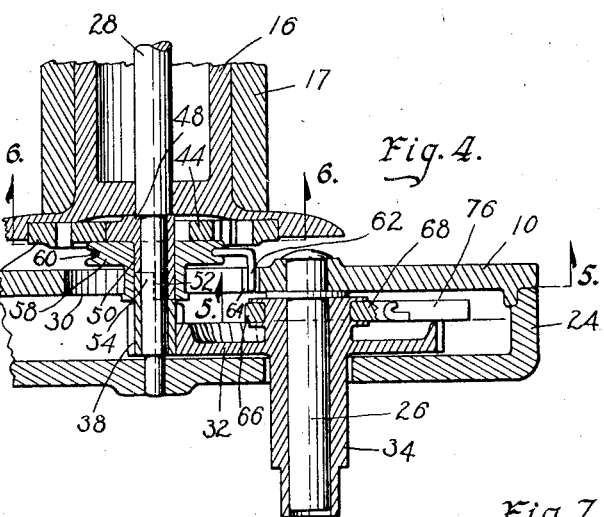
Figure 4 is an enlarged section on the line 4—4 of Figure 3, illustrating portions of the gear and clutch connections between the winding crank and the spool.

The spool 16 is rotatably mounted on a spindle 28 which projects through an opening 30 in the head plate 10 and is carried by the outer wall of the housing 24 as shown in Figure 4. The opposite end of the spindle 28 is suitably carried by the head plate 12.

Rotatably mounted on the spindle 26 within the housing 24 is a spur gear 32 which is formed with a sleeve 34 projecting through the outer wall of the housing and squared at its end to receive a hand crank 36.

The spur gear 32 meshes with and is adapted to drive a pinion 38 which is rotatably mounted on the spindle 28 of the spool within the housing 24.

The end of the spool 16 adjacent to the head plate 10 is recessed and an internal ratchet gear 40 is mounted therein and secured to the spool as by a close drive fit.

The teeth of the internal ratchet 40 are adapted to be engaged selectively by a tooth 42 formed on a substantially circular pawl member 44 and said pawl member is formed with a central opening of irregular shape defining an internal cam surface designated by the numeral 46.

Figures 6, 7:
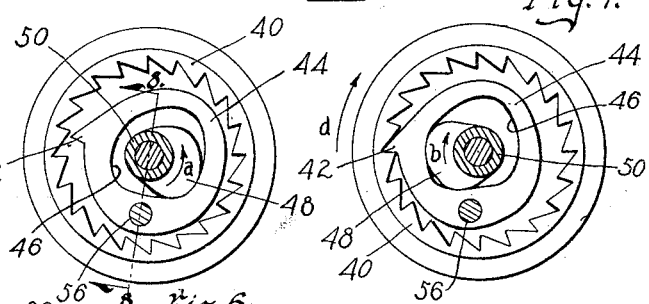
Figure 6 is a detail section on the line 6—6 of Figure 4 illustrating the clutch connections between the winding gears and the spool, said connections being here shown in released position.
Figure 7 is a similar view showing the clutch connections in engaged position.
Figure 8:
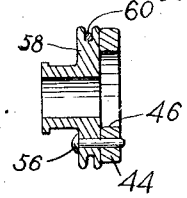
Figure 8 is a detail section on the line 8—8 of Figure 6, illustrating particularly the pawl carrier and pawl.

A cam member 48 is mounted within the central opening of the pawl member 44 and is suitably formed to engage the internal cam surface 46 for moving the pawl member either in the direction of the arrow $a$ in Figure 6 for causing the tooth 42 to engage one of the teeth of the internal ratchet 40; or for moving said member in the direction of the arrows $b$ in Figure 7 for causing a release of such connections.

The cam member 48 is formed on a sleeve 50 rotatably mounted on the spindle 28 and extending into the opening 30 of the head plate 10. The sleeve 50 is halved at its outer end to form a jaw or shoulder 52 cooperating with a similarly but oppositely formed jaw or shoulder 54 on the inner end of the pinion 38. By means of this connection the cam member 48 is caused to be rotated with the pinion 38 when the handcrank 36 is turned. Such connection first causes the cam member 48 to be turned freely through a portion of an arc in the direction of the arrow $a$ in Figure 6 to engage the left hand side of the cam surface 46 and cause the pawl member 44 to operatively engage the ratchet 40 for turning the spool 16 and winding in the line 18, which winding motion is carried on by continued rotation of the hand crank.

The pawl member 44 is pivoted eccentrically on a pin 56 carried by a disc shaped pawl carrier 58. The pawl carrier is mounted on the sleeve portion 50 of the cam member 48 and extends within the opening 30 of the head plate 10.

The pawl carrier 58 is peripherally grooved to receive a substantially annular spring 60 which has one end turned laterally to form a post 62. The post 62 is seated in one or another of a series of notches 64 formed in the wall of the opening 30 of the head plate 10 and by this means the pawl carrier is yieldingly anchored against free rotative movement.

The result of this method of mounting the pawl carrier and pawl member is that the pawl member 44 is permitted a limited rotary movement on the pin 56 under the influence of the cam member 48 when moving in either direction.

When the pawl member 44 has been moved to the left as indicated in Figure 6 for causing an engagement of its tooth 42 with the ratchet gear 40, continued rotation of the crank 36, gear 32, pinion 38 and cam 48 will cause the pawl member 44 to rotate for rotating the spool 16 for the winding-in operation. This rotation of the pawl member 44 will, of course, cause a rotary movement of the pawl carrier 58, because of the connection of these members through the pin 56; and this rotary movement of the pawl carrier 58 will be tensioned by slipping movement within the annular spring 60.

It is obvious that a reverse or backward rotary movement of the pinion 38 will cause a corresponding reverse movement of the cam member 48 and said member, traveling to the right as indicated in Figure 7, will cause interengagement of its cam surfaces with the internal cam surface 46 to rotate the pawl member 44 to the right, thus disengaging the tooth 42 from the internal ratchet 40 and positively holding the pawl member in disengaged position. This leaves the spool 16 entirely free to rotate as required in making a cast, and such rotation of the spool is entirely free and untrammeled by any other moving parts of the mechanism.

In some free spool mechanism dependence is placed upon the outward travel of the line in making a cast for releasing the spool from its clutch connections to the winding mechanism. In such construction there is of course a friction or drag on the line to accomplish this release and I have obviated this difficulty by providing a means for positively producing the release of the spool without reference to the outward travel of the line.

This is accomplished by the action of a retractile spring which produces a backward snap action of the crank when it is released by the operator.

To accomplish this a clamp device is mounted for limited rotary movement on the inner end portion of the sleeve 34 of the winding mechanism. This clamp device consists of two clamp members designated by the numerals 66 and 68 which cooperate to substantially embrace the sleeve within the housing 24.

Figure 5:
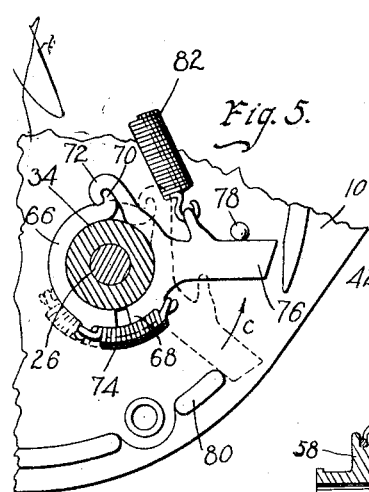
Figure 5 is a detail section on the line 5—5 of Figure 4, illustrating particularly the means for yieldingly mounting one end of the retractile spring which imparts a backward snap action to the winding crank upon release thereof.

The clamp members 66 and 68 are formed respectively with hooks 70 and 72 at one end which are interengaged as shown in Figure 5 for removably and pivotally holding the clamp members together. The opposite ends of the clamp members 66 and 68 are yieldingly connected by a coil spring 74.

The clamp member 68 is formed with a radially extending arm 76 which is arranged for limited travel between stops 78 and 80 projecting from the adjacent face of the head plate 10.

Figure 3:
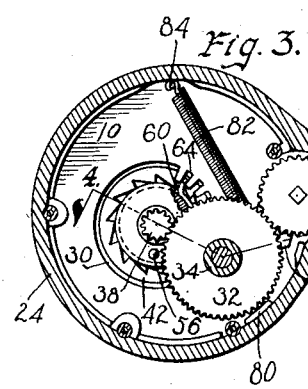
Figure 3 is a cross section on the line 3—3 of Figure 1.

A retractile coil spring 82 is connected at one end to the radial arm 76 and is suitably anchored at its opposite end as by a pin 84 (Figure 3) to the head plate 10.

When the winding-in operation is started by turning the hand crank 36, the radial arm 76 is turned from its normal position indicated by solid lines in Figure 5, wherein it is held in engagement with the stop 78 by the spring 82. This turning movement is accomplished because of the frictional engagement of the clamp members 66 and 68 with the sleeve 34, caused by the action of the spring 74 which is of greater strength than the spring 82, and such movement continues until the arm 76 engages the stop 80 as indicated by dotted lines. This causes the retractile spring 82 to be placed under tension, and thereafter turning movement of the hand crank will cause the sleeve 34 to slip within the clamp member.

When the hand crank 36 is voluntarily released by the operator, the retractile spring 82, which has previously been placed under tension, immediately acts to pull the arm 76 in the direction of the arrow $c$ in Figure 5, and the clamping engagement of the members 66 and 68 on the sleeve 34 under the influence of the spring 74, causes a slight reverse movement of said sleeve, as limited by the travel of the arm 76 from the stop 80 to the stop 78.

This backward movement of the sleeve 34 is communicated through the gear 32 and pinion 38 to the cam member 48 which is thus caused to move in the direction of the arrow $b$ in Figure 7 for releasing the pawl member 44 from the ratchet 40. By this positive means the spool 16 is immediately released and freed from the winding and clutch mechanism and is permitted to turn freely on its spindle 28 so that a cast may be made without any drag or friction on the line 18.

It frequently occurs that a fish makes a strike and causes an outward pull on the line 18 while the operator is still holding the hand crank 36, as for winding in the line. In such an event there is a pull on the spool in the direction of the arrow $d$ in Figure 7 and this tug or pull acts to pull a tooth of the internal ratchet 40 against the tooth 42 of the pawl member 44 and cause a frictional engagement of these parts. This pull and the consequent frictional engagement is sufficient to maintain the clutch connections in engaged position, even though the pull on the line may have been sufficient to cause the operator to release the hand crank 36. In other words, the free-spool clutch mechanism does not release when subjected to a sudden outward tug on the line such as might be caused by the sudden strike of a heavy fish. That is to say, such an involuntary release of the hand crank will not result in the backward snap and release of the clutch mechanism through action of the retractile spring 82 as previously described, but on the other hand the function of said retractile spring is temporarily rendered inoperative and the clutch mechanism is left in locked or engaged position. Thus, the spool remains connected to the winding-in mechanism and the spooling off or unreeling of a quantity of uncontrolled line is prevented.

However, as soon as the operator again regains control of the situation and moves the crank 36 forwardly as in the operation of winding the line back onto the spool, the retractile spring 82 becomes operative and should a voluntary release of the crank then occur, the free-spool mechanism is again in position for releasing the spool to make a free cast.

It is obvious that by my improved free-spool mechanism I have provided not only positive means for releasing the spool from the other mechanism for making a cast, but also for temporarily rendering said free-spool mechanism inoperative when an outward pull occurs on the line.

In the successful operation of the present free-spool mechanism I place considerable importance on the use of the cam member 48 for engaging the internal cam 46 to positively move the pawl member 44 to and from engaging position with the internal ratchet of the spool.

I also place considerable importance on the construction of the clamping member frictionally engaged by means of the springs 74 with the sleeve of the winding gear, for providing a connection for the end of the retractile spring 82. The use of the clamping members and clamping spring 74 insure a uniform and steady frictional engagement with the sleeve, which will not deteriorate with use.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a fishing reel, a frame, a winding member having a hand crank thereon, a gear on said winding member, a spool mounted for rotation in said frame, clutch means for connecting said spool with said gear whereby the spool may be rotated in one direction when said crank is turned, a clamp device frictionally engaging said winding member and composed of a pair of clamp members pivotally connected and a spring for applying tension to said clamp members, means to limit movement of said clamp device with the winding member in both directions, and a retractile spring connected with said clamp device and acting to produce a snap reverse movement of said gear for disconnecting the clutch connections to said spool, when force is released voluntarily from said crank.

2. In a fishing reel, a frame, a winding member having a hand crank thereon, a gear on said winding member, a spool mounted for free rotation in said frame, a pinion meshing with said gear, a cam arranged for rotation with said pinion, an internal ratchet gear carried by said spool, and a pawl member having a tooth for engaging said ratchet member, said pawl member being formed with a central opening having an irregular contour for engagement by said cam for positively moving the tooth of said pawl member into and out of engagement.

3. In a fishing reel, a frame, a winding member having a hand crank thereon, a gear on said winding member, a spool mounted for free rotation in said frame, a pinion meshing with said gear, a cam arranged for rotation with said pinion, an internal ratchet gear carried by said spool, a pawl member having a tooth for engaging said ratchet member, said pawl member being formed with a central opening having an irregular contour for engagement by said cam for positively moving the tooth of said pawl member into and out of engagement, and spring devices connected with and acting upon said gear for producing a limited reverse movement and causing said cam to disengage the pawl member from said ratchet member at times.

4. In a fishing reel, a frame, a winding member having a hand crank thereon, a gear on said winding member, a spool mounted for free rotation in said frame, a pinion meshing with said gear, a cam arranged for rotation with said pinion, an internal ratchet gear carried by said spool, a pawl member having a tooth for engaging said ratchet member, said pawl member being formed with a central opening having an irregular contour for engagement by said cam for positively moving the tooth of said pawl member into and out of engagement, a rotatably mounted pawl carrier on which said pawl member is pivoted, and yielding means for anchoring said pawl carrier and restraining free rotation thereof.

5. In a fishing reel, a frame, a winding member having a hand crank thereon, a gear on said winding member, a spool mounted for free rotation in said frame, a pinion meshing with said gear, a cam arranged for rotation with said pinion, an internal ratchet gear carried by said spool, a pawl member having a tooth for engaging said ratchet member, said pawl member being formed with a central opening having an irregular contour for engagement by said cam for positively moving the tooth of said pawl member into and out of engagement, a rotatably mounted pawl carrier on which said pawl member is eccentrically pivoted, said carrier being formed with a peripheral groove, and an anchoring spring frictionally engaging in said groove and having one end anchored to the frame.

6. In a fishing reel, a frame, a winding gear rotatably mounted therein, a hand crank for turning said gear, a spool mounted for free rotation in the frame and adapted to receive a line, a pinion meshing with said gear, a pawl carrier rotatably mounted, yielding means for restraining said carrier against free rotation, a pawl member eccentrically pivoted on said carrier, an internal ratchet gear fixed to said spool, said pawl member being formed with means for operatively engaging said ratchet gear and also being formed with an opening of irregular contour to form an internal cam, and a cam member arranged for rotation with said pinion, said cam member being located within the opening of said pawl member and adapted by engagement with the walls thereof to move the pawl member to and from operative engagement with said ratchet gear.

7. In a fishing reel, a frame, a winding gear rotatably mounted therein, a hand crank for turning said gear, a spool mounted for free rotation in the frame and adapted to receive a line, a pinion meshing with said gear, a pawl carrier rotatably mounted, yielding means for restraining said carrier against free rotation, a pawl member eccentrically pivoted on said carrier, an internal ratchet gear fixed to said spool, said pawl member being formed with means for operatively engaging said ratchet gear and also being formed with an opening of irregular contour to form an internal cam, a cam member arranged for rotation with said pinion, said cam member being located within the opening of said pawl member and adapted by engagement with the walls thereof to move the pawl member to and from operative engagement with said ratchet gear, a member frictionally engaging and arranged for limited rotary movement with said winding gear, and a retractile spring connected with said friction member and adapted to be placed under tension when said gear is turned for winding in the line, said retractile spring acting upon release of the winding force to cause a limited reverse movement of the gear for causing said cam to disengage the pawl member from the ratchet gear.

8. In a fishing reel, a frame, a winding gear rotatably mounted therein, a hand crank for turning said gear, a spool mounted for free rotation in the frame and adapted to receive a line, a pinion meshing with said gear, a pawl carrier rotatably mounted, yielding means for restraining said carrier against free rotation, a pawl member eccentrically pivoted on said carrier, an internal ratchet gear fixed to said spool, said pawl member being formed with means for operatively engaging said ratchet gear and also being formed with an opening of irregular contour to form an internal cam, a cam member arranged for rotation with said pinion, said cam member being located within the opening of said pawl member and adapted by engagement with the walls thereof to move the pawl member to and from operative engagement with said ratchet gear, a member frictionally engaging and arranged for limited rotary movement with said winding gear, and a retractile spring connected with said friction member and adapted to be placed under tension when said gear is turned for winding in the line, said retractile spring acting upon release of the winding force to cause a limited reverse movement of the gear for causing said cam to disengage the pawl member from the ratchet gear, the engagement of the pawl member with the ratchet gear being sufficient to prevent operation of the retractile spring and freeing of the spool when back pressure is applied by an outward tug on the line.

Des Moines, Iowa, July 9, 1930.

JOE KAUTZKY, Jr.